United States Patent [19]

Zehner et al.

[11] Patent Number: 4,864,397
[45] Date of Patent: Sep. 5, 1989

[54] ARRANGEMENT FOR PAST DPCM CODING OF VIDEO SIGNALS ACCORDING TO A 2-D OR 3-D CODING METHOD

[75] Inventors: Bernd Zehner; Fred Matthiesen, both of Munich; Matthias Schoebinger, Frankfurt am Main; Ulrich Totzek, Munich, all of Fed. Rep. of Germany

[73] Assignee: Siemens Aktiengesellschaft, Berlin and Munich, Fed. Rep. of Germany

[21] Appl. No.: 173,114

[22] Filed: Mar. 24, 1988

[30] Foreign Application Priority Data

Apr. 28, 1987 [DE] Fed. Rep. of Germany ....... 3714130

[51] Int. Cl.$^4$ .............................................. H04N 7/12
[52] U.S. Cl. .................................... 358/136; 358/135
[58] Field of Search ................... 358/135, 136, 12, 13; 375/27, 122

[56] References Cited

U.S. PATENT DOCUMENTS 4,281,344 7/1981 Mounts et al. .................. 358/136
4,636,856 1/1987 Starck ............................. 358/135
4,706,260 11/1987 Fedele et al. ..................... 375/27

Primary Examiner—James J. Groody
Assistant Examiner—Victor R. Kostak
Attorney, Agent, or Firm—Hill, Van Santen, Steadman & Simpson

[57] ABSTRACT

In a DPCM coder respective estimated values are subtracted from digitized picture element signals and estimated errors are used for signal transmission after quantization and coding. Each estimated value is derived from a reconstructed picture element signal formed in an adder. Separate, simultaneous subtractions of the signal taken at the output of the adder, as well as of the positive and negative adder limit values, from the respective picture element signal at the input thereby occur, whereby an overflow recognition device and a multiplexer provide that only the difference from the three differences formed up to this point are taken into consideration for quantization on the basis of the actual addition result, including no overflow, positive overflow and negative overflow.

13 Claims, 4 Drawing Sheets

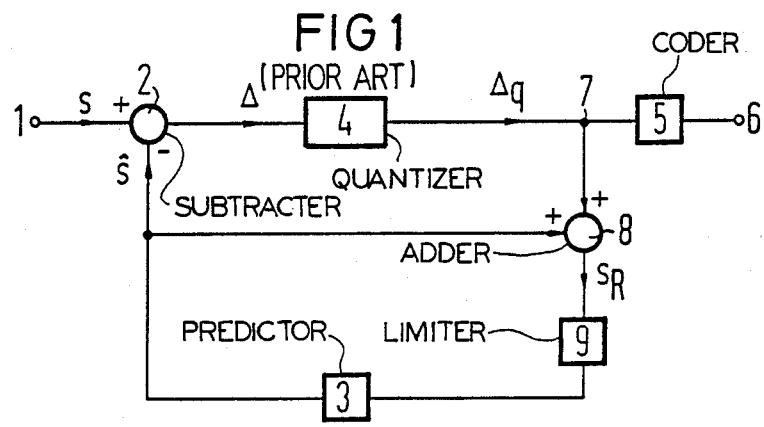
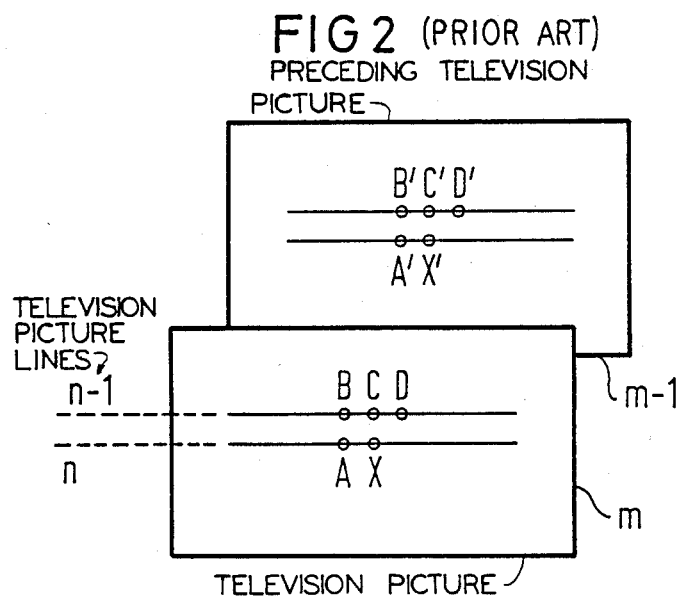

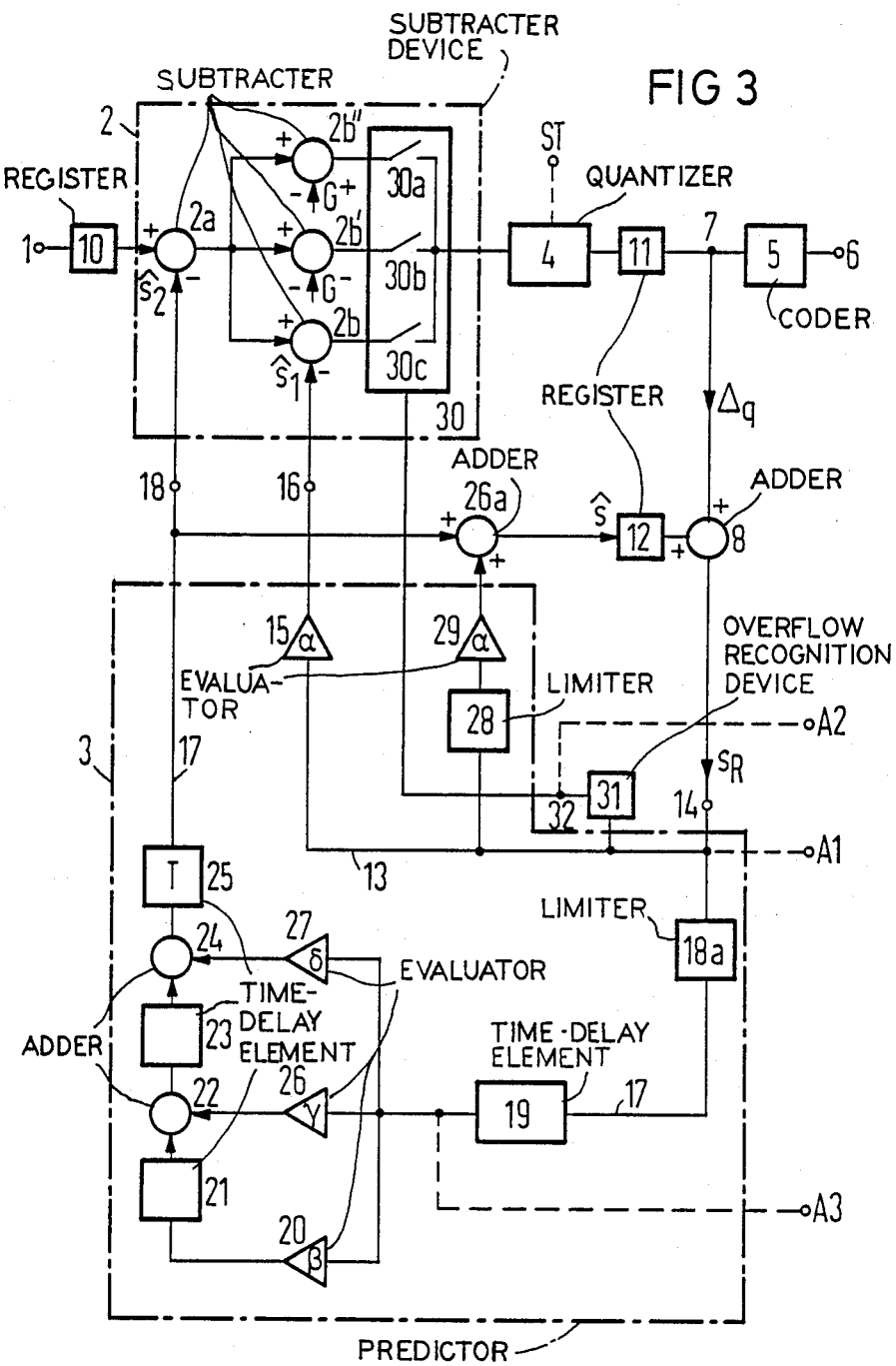

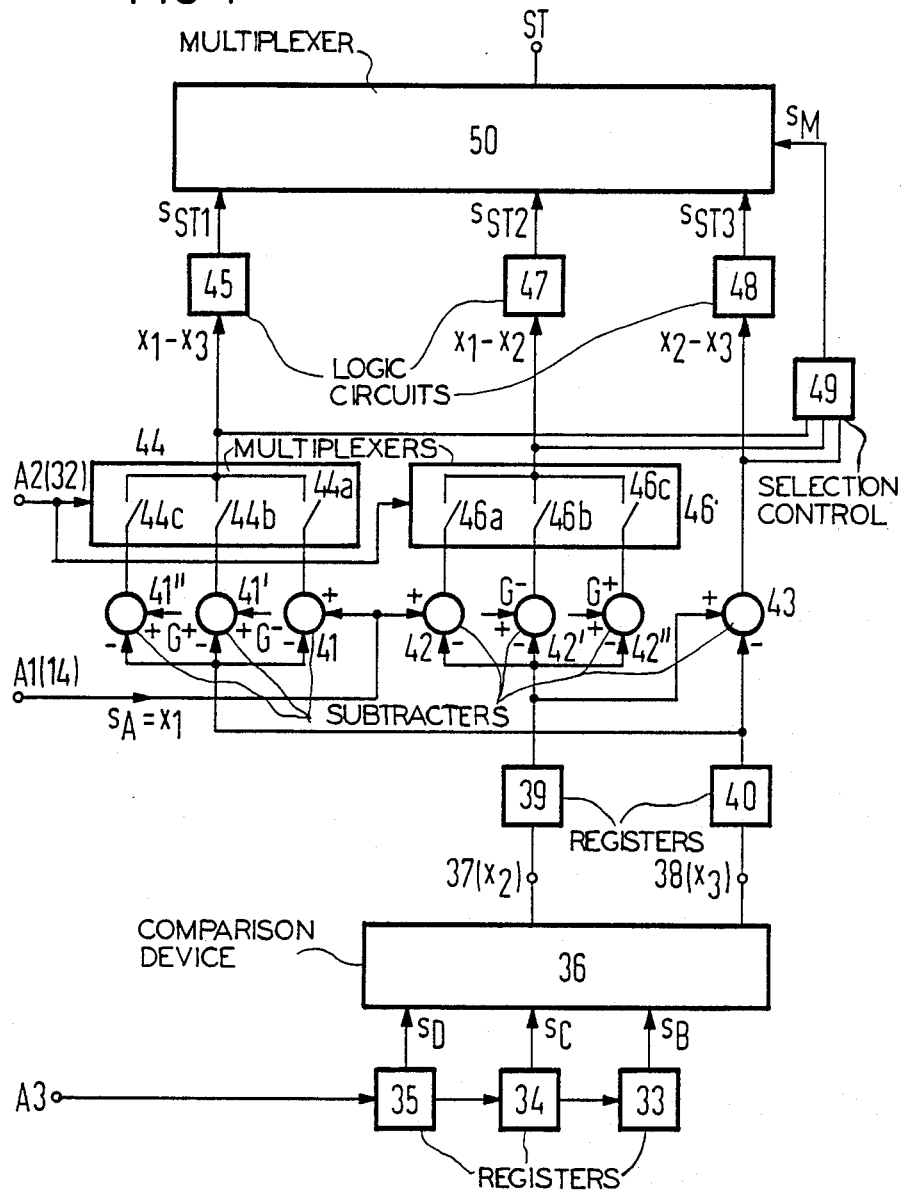

4,864,397

ARRANGEMENT FOR PAST DPCM CODING OF VIDEO SIGNALS ACCORDING TO A 2-D OR 3-D CODING METHOD

CROSS REFERENCE TO RELATED APPLICATION

This application is related to application Ser. No. 176,326 (Attorney Docket P87,2488), filed Mar. 31, 1988.

BACKGROUND OF THE INVENTION

1. Field of the Invention

The present invention relates to an arrangement for DPCM coding of television signals in which respective estimated values are subtracted from digitized picture elements and the difference signals obtained are used for signal transmission after quantization and coding and in which a recursive signal path that contains a first adder for the formation of reconstructive picture element signals from the quantized difference signals and the estimated values includes a limiter, a predictor for the formation of estimated values and a subtractor for the formation of the different signals.

2. Description of the Prior Art

An arrangement of the type generally set forth above is disclosed, for example, in the Proc. IEEE, Vol. 73, No. 4, April, 1985, pp. 592-598, with particular reference to FIGS. 1, 2 and 4, and is basically illustrated in the present FIG. 1. In FIG. 1, a sequence of digitized picture element signals s is received at an input 1, the picture element signal s is therefor supplied from therefor sample and hold stages that are not shown. Efforts are undertaken for the reduction of the data flow to remove redundant and irrelevant parts of the picture signal in order, for example, to be able to lower the bit transmission rate without thereby deteriorating the picture quality. More specifically, this occurs in that it is not the successive picture element signals that are transmitted via the transmission channel leading to a receiving location, but only the difference signals that are formed by the formation of the difference between a respectively current picture element signal s and an estimated value $\hat{s}$ identified in a predictor on the basis of the preceding picture element signals. Such a method is also referred to as difference pulse code modulation (DPCM).

The formation of the difference signal required for DPCM coding occurs in a subtracter 2 whose first input is connected to the input 1 and whose second input is connected to a predictor 3. Every difference signal Δ (also referred to as an estimated error) is quantized in a quantizer 4, whereby resulting quantized difference signal $\Delta_q = \Delta + q$ affected with the quantization error q is coded in a coder 5 and is supplied to the transmission channel via an output 6. A recursive signal path is provided for forming the estimated value $\hat{s}$. This signal path extends from a circuit point 7 at the output side of the quantizer 4, includes a first adder 8, a limiter 9 and the predictor 3. Such signal path terminates at the second input of the subtracter 2. The output of the predictor 3 is also connected to a second input of the first adder 8 that forms what is referred to as a reconstructed picture element signal $s_R$ by addition of the quantized different signal $\Delta_q$ and of the estimated value $\hat{s}$. The predictor 3 supplies the estimated value $\hat{s}$ from at least one of the preceding picture element signals for each current picture signal s.

When, according to FIG. 2, the current picture element lying in the line n in a television picture m is referenced X, the picture element scanned immediately therebefore is referenced A, the picture element of the preceding line n−1 corresponding to X is referenced C, and the picture elements adjacent to the latter and scanned immediately preceding or, respectively, following the latter are referenced B and D and when, furthermore, the corresponding picture elements of the preceding picture m−1 are referenced X' and A`−D', then the following occurs. The picture element signals of at least one of the points A–D can be utilized for the formation of the estimated value $\hat{s}$ for the picture element signal X, whereby one speaks of a two-dimensional (2D) prediction. When the picture element signals of at least one of the picture elements X' and A'−D` are additionally more exclusively used for this purpose, then a three-dimensional (3D) prediction is present. In the former instance, the estimated value $\hat{s}$, for example, be calculated according to the 2D-estimating equation $$\hat{s} = \alpha \cdot s_A + \beta s_B + \gamma \cdot s_C + \delta \cdot s_D \tag{1}$$

and, in the latter instance, can be calculated, for example, according to the 3D estimating equation $$\hat{s} = s_{X'} \tag{2}$$

whereby $s_A$ references the reconstructed picture element signal of the picture element A, $s_B$ represents that of the picture element B, etc., and whereby the coefficients $\alpha$, $\beta$, $\gamma$, and $\delta$, represent weighting factors that are assigned to the individual picture element signals. The estimating equation (2) is recommended when the contrast of the current picture element X, also referred to as "activity", is low in comparison to the picture elements surrounding the current picture element X.

SUMMARY OF THE INVENTION

The object of the present invention is to provide an arrangement of the type generally set forth wherein fast signal processing is guaranteed.

According to the invention, the above object is achieved in an arrangement for a DPCM coding of television signals, wherein respective estimated values are subtracted from digitized picture elements and the difference signals obtained are used for signal transmission after a quantization and coding, comprising a recursive signal path that contains a first adder for the formation of constructive picture element signals from the quantized difference signals and the estimated values, a limiter, a predictor for the formation of estimated values and a subtraction device for the formation of difference signals. The arrangement is therefor particularly characterized in that the subtraction device contains three subtracters whose first inputs are connected parallel to one another for receiving picture element signals or signals derived therefrom via a preceding subtractor. The second input of the first subtractor is connected to the output of the first adder. The second inputs of the two other subtracter are respectively charged with a lower limit value and with an upper limit value of the first adder. The outputs of the three subtracters are connected by way of a multiplexer to the input of a quantizer which executes the quantization, whereby a control input of the multiplexer is connected with an overflow recognition device controlled by the output of the first adder.

The advantage that may be obtained in practicing the present invention is, in particular, the reduced working times of the functional units in the recursive signal path, these being required for the formation and subtraction of the estimated values from the current picture element signal. The arrangement of the present invention is suitable for utilization both in 2D and 3D DPCM coding methods. The arrangement can be realized in a relatively simple manner in integrated circuit technology on a semiconductor body.

A further feature of the invention is characterized in that the preceding subtracter is connected to the digitized picture element signals by way of its first input and the second input thereof is connected to the output of the first adder via a series circuit composed of a plurality of time delay elements, further adders and a first limiter. The further adders each accept at one of the inputs thereof time-delayed picture element signals that can be taken at the output of one of the time delay elements. The second input of the preceding subtracter is connected to the first input of an additional adder whose second input is connected to the output of the first adder by way of a second limiter and whose output is connected to the second input of the first adder.

Another feature of the invention is particularly characterized in that the quantizer is constructed to be switchable to different quantization characteristics. Three reconstructed picture element signals are derived from one of the time-delay elements. A comparator is provided in which the largest of these three picture element signals and the smallest thereof are selected. Additionally, a reconstructed current picture element signal is taken at the output of the first adder. The difference between the current picture element signal and the largest picture element signal, between the current picture element signal and the smallest picture element signal and between the largest and the smallest picture element signal are calculated. A logic circuit is provided for each of these difference quantities. The assignment to a plurality of limit values and the amplitude class is calculated in the logic circuit, and a class-associated control signal corresponding to this assignment is also formed in the logic circuit. The class-associated control signal that belongs to the greatest of the three difference quantities is supplied to a control input of the quantizer via a second multiplexer, so that a quantization characteristic assigned to this class-associated control signal is selected. Two further subtracters are provided in addition to the subtracter forming the difference quantity between the current picture element signal and the smallest of the picture element signals, whereby the difference between the upper or, respectively, lower limit value of the first adder and the smallest of the picture element signals is respectively formed in these further subtracters. A third multiplexer controlled by the overflow recognition device is provided, the third multiplexer forwarding one of the results formed in the three latter subtracters to the following logic circuit as the difference quantity between the current picture element signal and the smallest picture element signal. Two further subtracters are provided in addition to the subtracter forming the difference quantity between the current picture signal and the largest of the picture element signals, whereby the difference between the upper or, respectively, lower limit value of the first adder and the largest of the picture element signals is respectively formed in these latter subtracters. A fourth multiplexer controlled by the overflow recognition device is provided, the fourth multiplexer forwarding one of the results for the three latter subtracters to a following logic circuit as the difference quantity between the current picture element signal and the largest picture element signal.

Another feature of the invention is characterized in that the second multiplexer is controlled via a selection control signal that is indicative of the operational signs of the difference quantity supplied to the logic circuits.

According to another feature of the invention, the arrangement is characterized in that a second recursive signal path is provided that contains a second, additional subtracter, a second quantizer, a second, additional adder, and a second predictor that comprises a time-delay element delaying the signal by about one image duration. The first input of the additional subtracter is charged with the digitized picture element signals. The second input of the subtracter is connected to the output of the second predictor. The output of the second predictor is connected to a second input of the second additional adder and the inputs of the first and of the second quantizer are connected to the inputs of a predictor control by way of whose output two switches arranged in series with the outputs of the first and second quantizers and two switches following those outputs of the first and second predictors that supply the estimated values can be controlled. The outputs of the first quantizer and the second quantizer are connected to one another via their following switches. Those outputs of the first predictor and the second predictor supplying the estimated values are connected to one another via their following switches.

According to another feature of the invention, the arrangement is characterized in that both inputs of the first adder are respectively preceded by a shift register charged with a clock pulse voltage.

According to another feature of the invention, the arrangement is characterized in that both inputs of the second additional adder are preceded by two further shift registers charged with clock pulse voltages.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a basic circuit diagram of a known arrangement for DPCM coding;

FIG. 2 is a schematic illustration of individual picture elements of two successive television pictures for the purpose of explaining the operation of the circuit of FIG. 1;

FIG. 3 is a schematic representation of a first exemplary embodiment of the invention;

FIG. 4 is a schematic representation of a circuit for supplementing the arrangement of FIG. 3 to form a DPCM coder having adaptive quantization.

DESCRIPTION OF THE PREFERRED EMBODIMENTS

Figure 5:
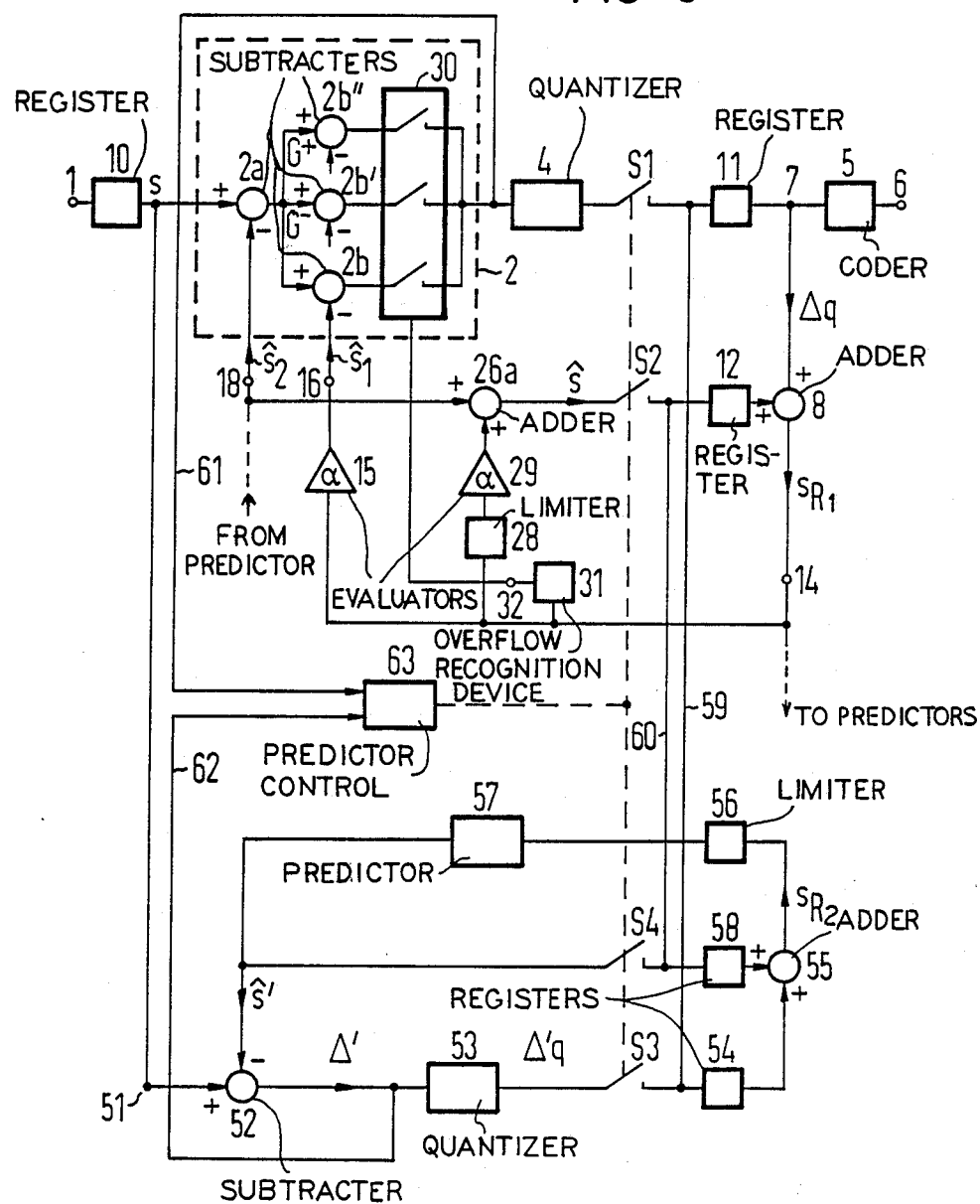
FIG. 5 is a schematic representation of a second exemplary embodiment of the invention.

Referring to FIG. 3, an arrangement is illustrated that is based on the fundamental structure of a DPCM coder of the type illustrated in FIG. 1. Provided in addition to the function units already set forth with reference to FIG. 1, and provided with the same reference characters, are a plurality of registers 10, 11 and 12 which are charged with clock pulse voltages, the register 10 connected in series with the input 1, the register 11 connected between the quantizer 4 and the circuit point 7, and the register 12 connected in front of the second input of the adder 8. At the beginning of a clock pulse period, it is assumed that a current picture element signal s to be stored in the register 10 is present, this current picture element signal s, for example, corresponding to the picture X. A quantized difference signal $\Delta_q$ that is derived from the picture element signal s of the period i−1 and, therefore, from the picture element A is stored in the register 11. It is also assumed that an estimated value s that is formed from the picture element signals of a few chronologically preceding clock pulse periods is stored in the register 12. During the clock pulse period i, the time condition thereby exists that a reconstructed page element signal $s_R$ must be formed in the adder 8, a new estimated value $\hat{s}$ is to be calculated in the predictor 3, a difference signal $\Delta = s - \hat{s}$ is to be formed in the subtracter 2, and a quantized signal $\Delta_q$ is to be derived in the quantizer 4, so that this latter signal has already been stored in the register 11 before the beginning of the next-successive clock pulse period i+1. The procedure is then repeated in the clock pulse period i+1, whereby the next-successive picture element signal is already stored in the register 10. There is therefore a time-critical signal path that proceeds from the output of the register 11 to the input of the register 11 via the circuit point 7, the adder 8, the predictor 3, the subtracter 2 and the quantizer 4. The signal processing within this time-critical path must occur within a clock pulse period.

Since the predictor 3 in FIG. 3 operates according to a 2D-estimating equation according to equation (1), it comprises a first circuit branch 13 that leads from the input 14 to a first output 16 via a first evaluator 15 that executes a signal waiting with a waiting factor. A signal component $\hat{s}_1$ of the estimated value $\hat{s}$ that is acquired with the assistance of a picture element A can be taken at the output 16. A second circuit branch proceeds from the output 14 to a second output 18 of the predictor and serves the purpose of providing a second signal component $\hat{s}_2$ acquired with the assistance of the picture elements B, C and D. The signal component $\hat{s}_2$ is thereby composed of a plurality of components whereof the first is derived via an evaluator 18a, a time-delay element 18, an evaluator 20 that carries out a weighting according to the factor $\beta$, and an iterative circuit of a time-delay element 21, an adder 22, a time-delay element 23, an adder 24 and a time-delay element 25. When it is assumed that the time-delay element 19 produces a delay that corresponds to the expression (z−2). T, whereby z indicates the plurality of picture elements per television line and T denotes the duration of a clock pulse period, and when it is further assumed that the time-delay elements 21, 23 and 25, preferably constructed as clocked registers, each delay by a clock pulse period duration T, then it can be seen that the first component $\hat{s}_2$ derives from the picture element B. A second component that is taken from the output of the time-delay element 19 via an evaluator 26 weighting with the weighting factor $\gamma$ and is supplied to an input of the adder 22 expresses the dependency of the signal component $\hat{s}_2$ on the picture element C, whereas the third component derived from the output of the time-delay element 19 via an evaluator 27 (factor $\delta$) expresses the influence of the picture element D. The estimated value s is then additively composed of the two signal components $\hat{s}_1$ and $\hat{s}_2$.

The division of the estimated value s into the two signal components $\hat{s}_1$ and $\hat{s}_2$ makes a corresponding necessary division of the subtracter 2 of FIG. 1 into two subtracters 2a and 2b connected to one another in an iterative manner. The signal component $\hat{s}_2$ is subtracted in the subtracter 2a from a picture element signal s stored in the register 10 and the signal component $\hat{s}_1$ is, in turn, subtracted in the subtracter 2b from the difference formed in this manner. On the other hand, the estimated value $\hat{s}$ is calculated in an adder 26a from the signal component $\hat{s}_2$ and $\hat{s}_1$, whereby the signal $\hat{s}_1$ is specially derived for this addition via a limiter 28 connected to the input 14 and via an evaluator 29 simulating the evaluator 15. The output of the adder 26a is connected to the input of the register 12.

Two further subtracters 2b' and 2b'', in addition to the subtractor 2b, are provided in FIG. 3, whereby the first inputs of the subtractors 2b, 2b' and 2b'' are connected in parallel to one another. Whereas, however, the second input of the subtracter 2b receives the signal component $\hat{s}_1$, the second input of the subtracter 2b' is supplied with a negative limiting value G− that corresponds to the negative limiting value of the limiter 9 of FIG. 1 multiplied by $\alpha$. The second input of the subtracter 2b'' receives a positive limiting value G+ that corresponds to the positive limiting value of the limiter 9 multiplied by $\alpha$. The outputs of the subtracters 2b, 2b' and 2b'' are connected to the inputs of a multiplexer 30 whose output is connected to the input of the quantizer 4. By way of its output 32, an overflow recognition device 31, that is connected to the output of the adder 8, controls the multiplexer 30. In case the sum formed in the adder 8 exceeds the prescribed, positive limit value G+ the output 32 thereby outputs a control signal that closes the switch 30a and connects the output of the subtracter 2b'' to the input of the quantizer 4. When the sum formed in the adder 8 falls below the prescribed, negative limit value G−, then the switch 30b of the multiplexer is closed and the output of the subtracter 2b' is connected to the input of the quantizer 4. When, finally, the sum formed in the adder 8 is located within the value range defined by the limit values G+ and G−, then the switch 30c is closed, so that the difference formed in the subtracter 2b proceeds to the input of the quantizer 4.

Since the evaluator 15 is arranged in series with the second input of the digital subtracter 2b, a weighting with a factor $\alpha$ that is expressed by a number $2^n$ (n=1, 2, etc, or −1, −2, etc) can be realized in a simple manner in that the signal to be weighted (the reconstructed picture element signal $s_R$ in this case) that, for example is composed of 8 bits is not supplied to the input of the stages of the subtracter 2b corresponding thereto placewise, but is supplied to the stage inputs offset by a corresponding place number in the direction towards more significant or less significant bits. The analogous case also applies to the evaluators, 20, 26, 27 and 29 whose functions can likewise be realized by an offset assignment of the individual bits of the individual signals to be evaluator relative to the inputs of the time-delay element 21 constructed as a register or relative to the stage inputs of the adders 22, 24, 26.

The weighted output of the adder 8 is directly connected to the input of the subtracter 2b. The sum formed in the adder 8 can thereby be applied to the individual stage inputs of the subtracter 2b corresponding to the carry run, with the stage having the lowest significance. The subtraction is therefore executed merely parallel with the additions and is delayed only by the signal running time from the input up to the sum output of the stage having the lowest significance in the adder 8. The function of the limiter 9 in FIG. 9 is then realized in that three difference quantities are formed in the subtracters 2b, 2b' and 2b'' independently of one another, whereof, respectively, only one is connected through to the quantizer 4. The decision as to which of the three differences is further processed is undertaken by the overflow recognition device 31. In a corresponding manner, the difference formed in the subtracter 2a is supplied bit-by-bit to the first inputs of the subtractors 2b, 2b' and 2b'', namely beginning with the stage having the lowest significance, so that the subtraction is executed in the substracters 2a and 2b also occur nearly simultaneously.

As a result of the limiter function realized according to the present invention, the signal processing in the recursive signal path is significantly accelerated in comparison to the signal processing of the circuit of FIG. 1, since a limiting of the sum signal in the limiter 9 of FIG. 1 cannot occur therein until after expiration of the full working time of the adder 8, and the subtracter 2 can only subsequently calculate the difference between the picture element signal s and the sum signal of the adder 8 which may be potentially limited.

The limiter 28, though, allows nearly no simultaneous sum formation in the adders 8 and 26; however, it lies in a signal path proceeding from the output of the register 12 to the input of the register 12 by way of the adder 8, the limiter 28, the evaluator 29 and the adder 26a, this signal path not be a time-critical signal path since no signal quantizing is undertaken therein.

FIG. 4 illustrates a circuit arrangement that supplements the arrangement of FIG. 3 to form a DPCM coder having adaptive quantization. It is assumed that the quantizer 4 can be switched to one of a plurality of quantizing characteristics that, in particular, differ from one another in that quantization steps of respectively different magnitudes are used. When the contrast of a picture element to be coded, for example the element X, to the picture element surrounding that element, which is only slight, then the quantizing occurs in small steps, whereas a switch to quantization characteristics having respectively larger quantization steps is undertaken given greater contrast values. The quantizer 4 is provided with a control input ST that is supplied with control signals that cause the quantizer to switch to a selected quantization characteristic. The circuit illustrated in FIG. 4 represents a control circuit by way of which the control signal supplied to the input ST is derived.

The control circuit of FIG. 4 comprises three inputs that are respectively connected to the outputs A1, A2 and A3 of the arrangement according to FIG. 3 and therefore also bear the same reference characters. The input A1 corresponds to the circuit point 14 of FIG. 3; the input A2 corresponds to the output 32 of the overflow recognition device 31; and the input A3 corresponds to the output of the time delay element 19. By way of the output A3, the reconstructed picture element signals $s_B$, $s_C$ and $s_D$ derived from the picture elements B, C and D are successively supplied to and stored in three registers 33-35 which are connected in series with one another. The picture element signals are first compared to one another in a comparison device 36 such that the greatest of these three picture element signals appears at a first output 37 of the comparison device 36, this picture element signal being referenced $x_2$. The smallest of these three signals, referenced $x_3$, appears at the second output 38 of the comparision device 36. The signal $x_2$ and $x_3$ are stored in following registers 39 and 30. The reconstructed picture element signal $s_A$ derived from the picture element A is supplied by way of the input A1 and is referenced below as $x_1$. The difference signals $x_1 - x_3$, $x_1 - x_2$ and $x_2 - x_3$ are then formed. Three subtracters 41, 42 and 43 are provided for this purpose, whereby the first inputs of the subtracters 41 and 42 are connected to the input A1 and the second inputs of the subtracters are respectively connected to the outputs of the registers 40 and 39. The first input of the subtracter 43 is connected to the output of the register 39 and the second input of the subtracter 43 is connected to the output of the register 40. The output of the subtracter 41 is connected by way of a multiplexer 44 to the input of a logic circuit 45 that classifies the difference signal $x_1-x_3$ into one of a plurality of amplitude classes and, dependent on the class into which the difference signals is classified, outputs a class-associated control signal $s_{ST1}$. When it is assumed that, for example, three different values GW1-GW3 are defined that limit four different amplitude classes, then a first control signal $s_{ST1}$ that selects a first quantization characteristic of the quantizer 4 is output when $x_1 - x_3$ lies below the limit value GW1. When the difference signal $x_1 - x_2$ lies between the limit value GW1 and GW2, then a second control signal $s_{ST2}$ that selects a second quantization characteristic occurs. When the difference signal $x_1 - x_3$ belongs to a class whose limits are established by the limits GW2 and GW3, then a third quantization characteristic is selected, whereas the affiliation of the difference signal to the fourth class lying above the limit GW3 conditions a selection of the fourth quantization characteristic.

In an analogous manner, the difference signal $x_1 - x_2$ formed in the subtracter 42 is supplied via a multiplexer 46 to the input of a logic circuit 47 that outputs a class-associated control signal $s_{ST2}$ dependent on the relationship of this difference signal to one of the aforementioned classes. Further, the difference signal $x_2 - x_3$ proceeds to the input of the logic circuit 48 in which a class-associated control signal $s_{ST3}$ is generated in the manner already set forth. A selection control 49 generates a control signal $s_m$ from the operational sign bits of the difference signals $x_1 - x_3$, $x_1 - x_2$ and $x_2 - x_3$ this control signal $s_M$ indicating which of these difference signals is the greatest. The control signal $s_M$ is then supplied to a multiplexer 50 that, dependent on the signal $s_M$, connects only one of the control signals $s_{ST1}$, $s_{ST2}$ or $s_{ST3}$ through to the input ST of the quantizer 4, namely that which had been derived from the greatest of these three latter difference signals.

Dependent on the maximum contrast that appears between two respective picture elements within the picture element group A, B, C and D, a quantization characteristic of the quantizer 4 assigned to this maximum contrast is selected with such a control circuit that is already fundamentally known from the German published application 33 31 426, corresponding U.S. Pat. No. 4,636,856 which is fully incorporated herein by this reference. The structure and the operation of the comparison device 36, of the logic circuits 45, 47 and 48 and of the selection control 49 may be derived from the just-mentioned publications.

The limiting function that is realized within the time-critical path 7, 8, 15, 2, 4 and 11 (FIG. 3) by the subtracters 2b' and 2b'' operating in parallel to the subtracter 2b, by the multiplexer 30 and by the overflow recognition device 31 is realized in the control circuit according to FIG. 4 in that two further subtracters 41' and 41'' are provided in addition to the subtractor 41, whereby the second inputs of all of these subtractors are connected in parallel to one another. The first input of the subtracter 41'' is connected to receive the negative limiting value G−; the first input of the subtracter 41'' is connected to receive the positive limiting value G+. The outputs of the subtracters 41, 41' and 41'' are applied to assigned inputs of a multiplexer 44 that connects only one of the subtracter outputs through to the input of the logic circuit 45 by way of switches 44a–44c. In an analogous manner, two further subtracter 42' and 42'' are assigned to the subtracter 42, whereby, respectively, one of the outputs of the subtracters 42, 42' and 42'' is connected through to the input of the logic circuit 47 by way of the switches 46a–46c of the multiplexer 46. The control of the switches 44a–44c and 46a–46c occurs dependent on the output signal of the overflow recognition device 31 that is supplied by way of the input 42. When the signal $s_A$ remains within the value range defined by the limits G+ and G−, then the switches 44a and 46a are closed. When, by contrast, the picture element signal $s_a$ exceeds the positive limit value G+, then the switches 44c and 46c close; and, when the signal $s_a$ falls below the negative limit value G−, then the switches 44b and 46b are closed. Despite the preservation of a limiting function within the recursive circuit branch 7, 8, A1, 41 (42), 44 (46), 45 (47), 50, 4 and 11, a rapid control of the quantizer 4 is thereby achieved, since a nearly simultaneous addition in the adder 8 and subtraction in the subtracter 41, 41', 41'' and 42, 42' and 42Δ occurs.

FIG. 5 shows an adaptive 3D DPCM coder wherein the prediction of the estimated value is undertaken in such a manner that a switching from a 2D-estimated equation, for example the equation (1), to a 3D-estimating equation, for example the equation (2), or vice-versa, occurs dependent on the respective picture element signals to be transmitted. The 2D-estimating equation (1) is employed given an adequately-great contrast within the picture element group A–D; the estimating equation (2) is employed given contrast values that are too low. Two separate DPCM loops are provided, whereof the first works based on the 2D-estimating equation (1) and is constructed in accordance with FIG. 3 and is provided with the reference characters already used therein. That part of the loop that takes the signal components $\hat{s}_2$ into consideration has been omitted merely for reasons of clarity. Differing from FIG. 3, a switch S1 is inserted between the output of the quantizer 4 and the input of the register 11 and a switch S2 is connected between the output of the adder 26a and the input of the register 12. From the output of the register 10, one proceeds to the input 51 of a second loop operating based on the 3D-estimating equation (2). This loop comprises a subtracter 52 whose first input is connected to a circuit point 51 (output of the register 10) and whose output is connected to the input of a quantizer 53 whose output is connected to the input of a register 54 by way of a switch S3. The output of the register 54 is connected to the first input of an adder 55 whose output is connected to the input of a limiter 56. From the output of the latter, one proceeds to the input of a predictor 57 whose output is connected to the second input of the subtracter 52 and, via a switch S4, to the input of a further register 58 whose output is connected to the second input of the adder 55. The predictor 57 supplies an estimated value $\hat{s}'$ that, according to the equation (2), corresponds to the reconstructed signal $s_X'$ that had been derived from the picture element X' of the preceding picture m − 1. Since the predictor 57 contains time-delay elements that are not shown in detail and that delay the formation of the signal $\hat{s}'$ by about one image duration, no time-critical path is present in the 3-D-loop 51-58 that would require a data processing speed as must be demanded for the 2D-loop 11, 7, 8, 15, 2 and 4. The inputs of the register 11 and 54 are connected in parallel with one another by way of a line 59 and the inputs of the registers 12 and 58 are connected in parallel with one another by way of a line 60.

For explaining the operation of the arrangement of FIG. 5, it is assumed that the switches S1 and S2 are closed and that the switches S3 and S4 are initially opened. The 2-D loop thereby functions as already set forth with reference to FIG. 3, whereas the 3D-loop is supplied with quantized estimated error $\Delta_q$ of the 2D-loop via the register 54 and is supplied with the estimated value $\hat{s}$ of the 2D-loop via a register 58 and forms an estimated value $\hat{s}'$ therefrom with the assistance of the predictor 57. In the subtracter 52, the estimated value $\hat{s}'$ is subtracted from a picture element signal s at the input side, so that a 3D-estimated error $\Delta'$ is formed. The estimated errors $\Delta$ and $\Delta'$ are now supplied by way of two lines 61 and 62 to the inputs of a predictor control 63 by way of whose output the switches S1-S4 are driven. To this end, which of the two signals $\Delta$ or $\Delta'$ is smaller than the other is identified in the predictor control 63. When the signal $\Delta$ is smaller, i.e. when the 2D-loop supplies the better-estimated value, then the switches S1 and S2 remain closed, whereby the estimated error $\Delta_q$ is quantized in the quantizer 4 and is coded in the coder 5 and then forwarded on the transmission path via the output 6. When, however, the 3-D loop supplies the smaller estimated error $\Delta'$, then the switches S1 and S2 are opened and the switches S3 and S4 are closed instead. After passing through the register 11 and the coder 5, the quantized estimated error $\Delta_q'$ thereby proceeds by way of the output 6 onto the transmission path and, moveover, proceeds via the registers 11 and 12 into the upper 2D-loop that forms the next estimated value s therefrom with the assistance of the predictor contained therein. When, however, a determination is made at the next, adjacent picture element signal s that the estimated error $\Delta$ is again smaller than the estimated error $\Delta'$, then a renewed switching onto the 2D-loop occurs, this being effected by closing the switches S1 and S2 and by opening the switches S3 and S4.

Further embodiments of the invention may be provided which differ from those set forth above in that the limiting values G+ and G− of the first adder 8 that set the outer limits of the value range output by the adder 8 exhibit the same operational signs. For example, the limit values $G^{30}$ and $G^{31}$ can each represent positive limiting values. In general terms, the limit $G^{30}$ is therefore referred to as the upper limiting value and the limit $G^{31}$ is therefore to be referred to as the lower limiting value.

Although we have described our invention by reference to particular illustrative embodiments thereof, many changes and modifications of the invention may become apparent to those skilled in the art without departing from the spirit and scope of the invention. We therefore intend to include within the patent warrented hereon all such changes and modifications as may reasonably and properly be included within the scope of our contribution to the art.

We claim:

1. An arrangement for DPCM coding of television signals comprising:
    subtracter means for subtracting a first evaluated signal from a current digitized picture element signal to produce a first difference signal, and for subtracting a second evaluated signal, an upper limit signal and a lower limit signal from said first difference signal to respectively produce a second difference signal, an upper value limited signal and a lower value limited signal, said subtracter means providing means for selectively through-connecting said second difference signal, said upper value limited signal or said lower value limited signal to an output of said subtracter means in response to an overflow control signal;
    quantizer means for quantizing said output of said subtracter means to generate a quantized difference signal at an output of said quantizer;
    predictor means for accepting a series of reconstructed signals and generating therefrom said first and second evaluated signals and a limited weighted signal, said predictor means including
    means for generating said first evaluated signal from a weighted sum of said reconstructed signals wherein said reconstructed signals represent a first picture element located at an X−Z element position, a second picture element located at an X−(Z+1) element position, and a third picture element located at an X−(Z+2) element position,
    means for generating said second evaluated signal by weighting a reconstructed signal representing a fourth picture element located at an X−1 element position,
    where X is a position of a current picture element to be processed and Z is the number of picture elements per scan,
    means for generating said limited weighted generated by weighting and limiting said reconstructed signal representing said fourth picture element;
    first adder means for adding said limited weighted signal to said first evaluated signal to generate a predicted output signal; second adder means for adding said predicted output signal to said quantized difference signal to generate said series of reconstructed signals at an output of said second adder means; and
    overflow recognition means for generating said overflow control signals in response to said series of reconstructed signals.

2. An arrangement for DPCM coding as defined in claim 1, wherein said subtracter means comprises: register means for clocking said current digitized picture element signal to an output of said register means;
    a first subtracter having a first input accepting said output of said register means, a second input accepting said first evaluated signal, and an output signal, said output signal generated as said first difference signal;
    a second subtracter having a first input accepting said first difference signal, a second input accepting said upper limit signal, and an output signal, said output signal generated as said upper value limited signal;
    a third subtracter having a first input accepting said first difference signal, a second input accepting said lower limit signal, and an output signal, said output signal generated as said lower value limited signal;
    a fourth subtracter having a first input accepting said first difference signal, a second input accepting said second evaluated signal, and an output signal, said output signal generated as said second difference signal; and
    multiplexing means for selectively through-connecting said second difference signal, said lower value limited signal or said upper value limited signal to an output of said multiplexing means in response to said overflow control signal.

3. An arrangement for DPCM coding as defined in claim 1, wherein said predictor means comprises:
    a first limiter having an input accepting said series of reconstructed signals and having an output;
    time delay means having an input signal accepting said output of said first limiter, for delaying said input signal for a period of time corresponding to an occurrence of (Z−2) digitized picture element signals, Z being equal to the number of digitized picture elements per scan line, thereby to form a delayed output signal;
    a plurality of evaluator means each accepting said delayed output signal for respectively producing a weighted signal output corresponding to the output of said time delay means; adder/delay means accepting said weighted signal outputs from said plurality of evaluator means, for delaying and additively combining said weighted signal outputs to generate said first evaluated signal;
    a second limiter haivng an input accepting said output of said second adder, said second limiter having an output;
    evaluator means for weighting said output of said second limiter to produce said limited weighted signal;
    further evaluator means for weighting said series of reconstructed signals to generate a series of said second evaluated signals.

4. An arrangement for DPCM coding as defined in claim 1, further comprising coding means for coding said quantized difference signal to form a coded output signal, said output signal being supplied to a transmission channel.

5. An arrangement for DPCM coding as defined in claim 1, wherein said adder/delay means comprises an alternatingly arranged series of adders and time delay elements, each of said adders having a first input accepting an output from a respective previously occuring time delay element in said alternatingly arranged series and a second input accepting an output of a respective evaluator means of said plurality of evalutator means.

6. An arrangement for DPCM coding as defined in claim 1, wherein said quantizer means comprises:
    a quantizer having an input accepting said output of said subtracter means and having an output; and
    register means for clocking said output of said quantizer to an output of said register means.

7. An arrangement for DPCM coding as defined in claim 1, wherein said second adder means comprises:
register means for clocking said predicted output signal from said frist adder means to an output of said register means; and
an adder having a first input accepting said output of said register means, a second input accepting said quantized difference signal, and an output forming said series of reconstructed signals.

8. An arrangement for DPCM coding as defined in claim 6, wherein said quantizer means includes a control input and is switchable to different quantization characteristics in response to said control input, said arrangement further comprising quantizer control means for generating said control input to said quantizer.

9. An arrangement for DPCM coding as defined in claim 8, wherein said quantizer control means comprises:
register means for accepting a sequence of three delayed output signals from said time delay means, said three delayed output signals corresponding to said first, second and third picture elements, said register means having three parallel outputs respectively representing said first, second and third picture elements;
comparator means for comparing said three parallel outputs of said register means and generating from said three parallel outputs first (X2) and second (X3) output signals at outputs of said comparator means, said first output representative of the largest signal value of said three parallel outputs and said second output representative of the smallest signal value of said three parallel outputs;
further subtracter means accepting said first (X2) and second (X3) outputs signals from said comparator and said output (X1) of said second adder to generate a third difference signal representative of a signal value X1 - X3, a fourth difference signal representative of a signal value X1 - X2, and a fifth difference signal representative of a signal value X2 - X3; a plurality of logic circuit means respectively receiving said third, foruth and firth difference signals for respectively generating a frist class-associated control signal, a second class-associated control signal and a third class-associated control signal from said third, fourth and fifth difference signals;
multiplexer means for selectively through-connecting said first, second or third class-associated control signals to an output of said multiplexer means in response to a selection control signal, said selection control signal indicative of which of said third, fourth or fifth difference signals has a greater signal value, said output of said multiplexer means connected to said control input of said quantizer means;
selection control means for generating said selection control signal from said third, fourth and fifth difference signals.

10. An arrangement for DPCM coding as recited in claim 9, wherein said further subtracter means comprises:
a first subtracter having a first input accepting said output of said second adder and a second input accepting said first output of said comparator means, said first subtracter having an output;
a second subtracter haivng a first input accepting said upper limit signal and a second input accepting said first output of said comparator means, said second subtracter having an output; a third subtracter haivng a first input accepting said lower limit signal and a second input accepting said first output of said comparator means, said third subtracter having an output;
a fourth subtracter having a first input accepting said output of said second adder and a second input accepting said second output of said comparator means, said fourth subtracter having an output;
a fifth subtracter having a first input accepting said upper limit signal and a second input accepting said second output of said comparator means, said fifth subtracter having an output;
a sixth subtracter having a first input accepting said lower limit signal and a second input accepting said second output of said comparator means, said sixth subtracter having an output;
a first multiplexer means for selectively through-connecting the output of said first, second, or third subtracter to an output of said first multiplexer means in response to said overflow control signal;
a second multiplexer means for selectively through-connecting the output of said fourth, fifth or sixth subtracter to an output of said second multiplexer means in response to said overflow control signal; and,
a seventh subtracter having a first input accepting said first output of said comparator means and a second input accepting said second output of said comparator means, said sixth subtracter having an output.

11. An arrangement for DPCM coding of television signals comprising:
first register means for accepting a current digitized picture element signal and clocking said current digitized picture element signal to an output thereof;
first subtracter means for subtracting a first evaluated signal from said output of said register means to produce a first difference signal, and for subtracting a second evalutated signal, an upper limit signal and a lower limit signal from said first difference signal to respectively produce a second difference signal, an upper value limited signal and a lower value limited signal, said first subtracter means providing means for selectively through-connecting said second difference signal, said upper value limited signal or said lower value limited signal to an output of said first subtracter means in response to overflow control signals;
first quantizer means for quantizing said output of said first subtracter means to generate a quantized difference signal at an output of said quantizer means;
second register means for accepting an input signal at an input thereof and clocking said input signal to an output thereof;
first predictor means for accepting a series of reconstructed signals and generating therefrom said first and second evaluated signals and a limited weighted signal, said predictor means including,
means for generating said first evaluated signal from a weighted sum of said reconstructed signals wherein said reconstructed signals represent a first picture element located at an $X-Z$ element position, a second picture element located at an $X-(Z+1)$ element position, and a third picture element located at an X−(Z+2) element position, means for generating said second evaluated signal by weighting a reconstructed signal representing a fourth picture element located at an X−1 element position, where X is the position of a current picture element to be processed and Z is the number of picture elements per scan, means for generating said limited weighted signal by weighting and limiting said reconstructed signal representing said fourth picture element;

first adder means for adding said limited weighted signal to said first evaluated signal to generate a predicted output signal;

third register means for accepting an input signal and clocking said input signal to an output thereof;

second adder means for adding said output of said first register means to said output of said third register means to generate said series of reconstructed signals at an output of said second adder means;

overflow recognition means for generating said overflow control signals in response to said series of reconstructed signals;

second subtracter means for subtracting a further predicted output signal from said output of said first register means to generate a third difference signal;

second quantizer means for quantizing said output of said second subtracter means to generate a further quantized difference signal at an output of said second quantizer means;

fourth register means for accepting an input signal at an input thereof and clocking said input signal to an output thereof;

fifth register means for accepting an input signal at an input thereof and clocking said input signal to an output thereof;

third adder means for adding said output of said fourth register means to said output of said fifth register means to generate a further series of reconstructed signals;

limiter means for generating limited reconstructed signals from said further series of reconstructed signals;

second predictor means for generating said further predicted output signal from said limited reconstructed signals, said further predicted output signal corresponding to a 3-dimensional estimated error;

predictor control means accepting said third difference signal and said output of said first subtracter means for through-connecting said quantized difference signal to said inputs of said second and fifth register means and for through-connecting said predicted output signal to said inputs of said third and fourth register means whenever said output of said first subtracter means is greater than said third difference signal, said predictor means also providing means for through-connecting said further quantized difference signal to said inputs of said second and fifth register means and for through-connecting said further predicted output signal to said inputs of said third and fourth register means whenever said output of said first subtracter means is less than said third difference signal.

12. An arrangement for DPCM coding as recited in claim 11, wherein said predictor control means comprises:

a first switch disposed between said output of said first quantizer means and said inputs of said second and fifth register means, said inputs of said second and fifth register means commonly connected to said first switch;

a second switch disposed between said output of said first adder means and said inputs of said third and fourth register means, said inputs of said third and fourth register means commonly connected to said second switch;

a third switch disposed between said output of said second quantizer means and said inputs of said second and fifth register means, said inputs of said second and fifth register means commonly connected to said third switch;

a fourth switch disposed between said output of said second adder means and said inputs of said third and fourth register means, said inputs of said third and fourth register means commonly connected to said fourth switch;

control means accepting said third difference signal and said output of said first subtracter means, for controlling said first, second, third and fourth switches in response to a result of a comparison of said third difference signal and said output of said first subtracter means.

13. An arrangement for DPCM coding as defined in claim 12, further comprising coding means for coding said output of said second register means to form a coded output signal, said coded output signal being supplied to a transmission channel.

* * * * *